(12) United States Patent
Lee et al.

(10) Patent No.: US 11,572,893 B2
(45) Date of Patent: Feb. 7, 2023

(54) HUMIDIFICATION AND AIR CLEANING APPARATUS

(71) Applicant: LG ELECTRONICS INC., Seoul (KR)

(72) Inventors: Taehun Lee, Seoul (KR); Jaehyuk Jung, Seoul (KR); Seokho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/113,227

(22) Filed: Dec. 7, 2020

(65) Prior Publication Data

US 2021/0172456 A1    Jun. 10, 2021

(30) Foreign Application Priority Data

Dec. 6, 2019   (KR) .......................... 10-2019-0161478

(51) Int. Cl.
   *F04D 29/44*   (2006.01)
   *F04D 25/08*   (2006.01)
   (Continued)

(52) U.S. Cl.
   CPC ........... *F04D 29/444* (2013.01); *F04D 25/08* (2013.01); *F04D 29/053* (2013.01); *F24F 13/20* (2013.01); *F24F 2013/205* (2013.01)

(58) Field of Classification Search
   CPC ...... F04D 29/444; F04D 25/08; F04D 29/053; F04D 29/4253; F04D 29/2255; F04D 29/44; F04D 29/54; F24F 13/20; F24F 2013/205; F24F 1/0328; F24F 1/037; F24F 7/003; F24F 8/125; F24F 8/133; F24F 13/08; F24F 6/12; F24F 3/16; F24F 11/74; F24F 13/24;
   (Continued)

(56) References Cited

U.S. PATENT DOCUMENTS 4,877,373 A     10/1989  Bandukwalla
5,595,473 A  *   1/1997  Nagaoka ............. F04D 29/2216
                                                    415/199.1
(Continued)

FOREIGN PATENT DOCUMENTS

CN         204678647           9/2015
CN         204678647  U  *    9/2015
(Continued)

OTHER PUBLICATIONS

Disch, Thomas M.; "Optimizing the Sound Quality of Air Cooled Engine Fans Using Synthesized Noise Sources"; SAE Transactions, vol. 104, Section 6: Journal of Passenger Cars, Part 2, 1995, pp. 2318-2323. (Year: 1995).*

(Continued)

*Primary Examiner* — Woody A Lee, Jr.
*Assistant Examiner* — Eric A Lange
(74) *Attorney, Agent, or Firm* — KED & Associates, LLP

(57) ABSTRACT

A humidification and air cleaning apparatus is provided, in which a first sweep angle and a second sweep angle are formed at diffuser blades, and an included angle is formed between the first sweep angle and the second sweep angle, such that a phase difference is formed in air passing through the diffuser blades, and thus, air flow noise may be reduced.

14 Claims, 17 Drawing Sheets

(51) Int. Cl.
*F04D 29/053* (2006.01)
*F24F 13/20* (2006.01)

(58) Field of Classification Search
CPC .... F24F 8/10; F24F 6/14; F24F 13/082; F24F 2006/008; F05D 2240/122; F05D 2250/52; Y02A 50/20
See application file for complete search history.

(56) References Cited

U.S. PATENT DOCUMENTS

| | | | | |
|---|---|---|---|---|
| 8,678,752 | B2* | 3/2014 | Delvaux | F01D 5/16 415/119 |
| 2001/0052733 | A1* | 12/2001 | Fujii | H02K 5/10 310/58 |
| 2013/0309082 | A1* | 11/2013 | Sugimura | F01D 1/06 415/211.2 |
| 2015/0115481 | A1 | 4/2015 | Jang et al. | |
| 2017/0122329 | A1* | 5/2017 | Son | F04D 29/701 |
| 2021/0262488 | A1* | 8/2021 | Loercher | F04D 29/4226 |

FOREIGN PATENT DOCUMENTS

| | | |
|---|---|---|
| CN | 105134651 | 12/2015 |
| CN | 208024591 | 10/2018 |
| CN | 109681981 | 4/2019 |
| EP | 3 163 178 | 5/2017 |
| KR | 10-2009-0069400 | 7/2009 |
| KR | 10-2017-0051107 | 5/2017 |

OTHER PUBLICATIONS

European Search Report issued in Application No. 20211897.2 dated May 10, 2021.
Chinese Office Action dated Dec. 30, 2021 issued in Application No. 202011409804.9 (English translation attached).

* cited by examiner

| | rpm | POWER CONSUMPTION | NOISE |
|---|---|---|---|
| DUAL SWEEP ANGLE AT ONE-THIRD POSITION | 1949 | 90.6 | 51.2 |
| DUAL SWEEP ANGLE AT TWO-THIRDS POSITION | 1953 | 91.1 | 51.4 |

ONE-THIRD POSITION

TWO-THIRDS POSITION

HUMIDIFICATION AND AIR CLEANING APPARATUS

CROSS-REFERENCE TO RELATED APPLICATION(S)

This application claims priority under 35 U.S.C. § 119 to Korean Application No. 10-2019-0161478, filed in Korea on Dec. 6, 2019, whose entire disclosure is hereby incorporated by reference.

BACKGROUND

1. Field

A humidification and air cleaning apparatus is disclosed herein.

2. Background

Air conditioning apparatuses include air conditioners that control a temperature of air, air cleaners that remove foreign substances from air to maintain air cleanliness, humidifiers that increase humidity in the air, and dehumidifiers that reduce humidity in the air. Typical humidifiers are classified into a vibration type, which atomizes water on a vibrating plate and discharges it into air, and a natural evaporation type which evaporates water in a humidification filter.

The natural evaporation type humidifier is classified into a disc type humidifier, which rotates a disc using a drive force and allows water to naturally evaporate from the surface of the disc in the air, and a humidification filter type humidifier which allows water to naturally evaporate from a wet humidification medium by flowing air.

Korean Laid-Open Patent Publication No. 10-2017-0051107 (hereinafter referred to as the "related art document"), which is hereby incorporated by reference, discloses an apparatus for both humidification and air cleaning. In the humidification and air cleaning apparatus disclosed in the related art document, a plurality of vanes is disposed above a blower fan, to guide a flow of air discharged upward. However, the related art document has a problem in that when an air blower unit operates at a high speed, a lot of noise may be generated due to an increase in air volume at the vanes guiding the discharged air.

BRIEF DESCRIPTION OF THE DRAWINGS

Embodiments will be described in detail with reference to the following drawings in which like reference numerals refer to like elements, and wherein.

DETAILED DESCRIPTION

Figure 1:
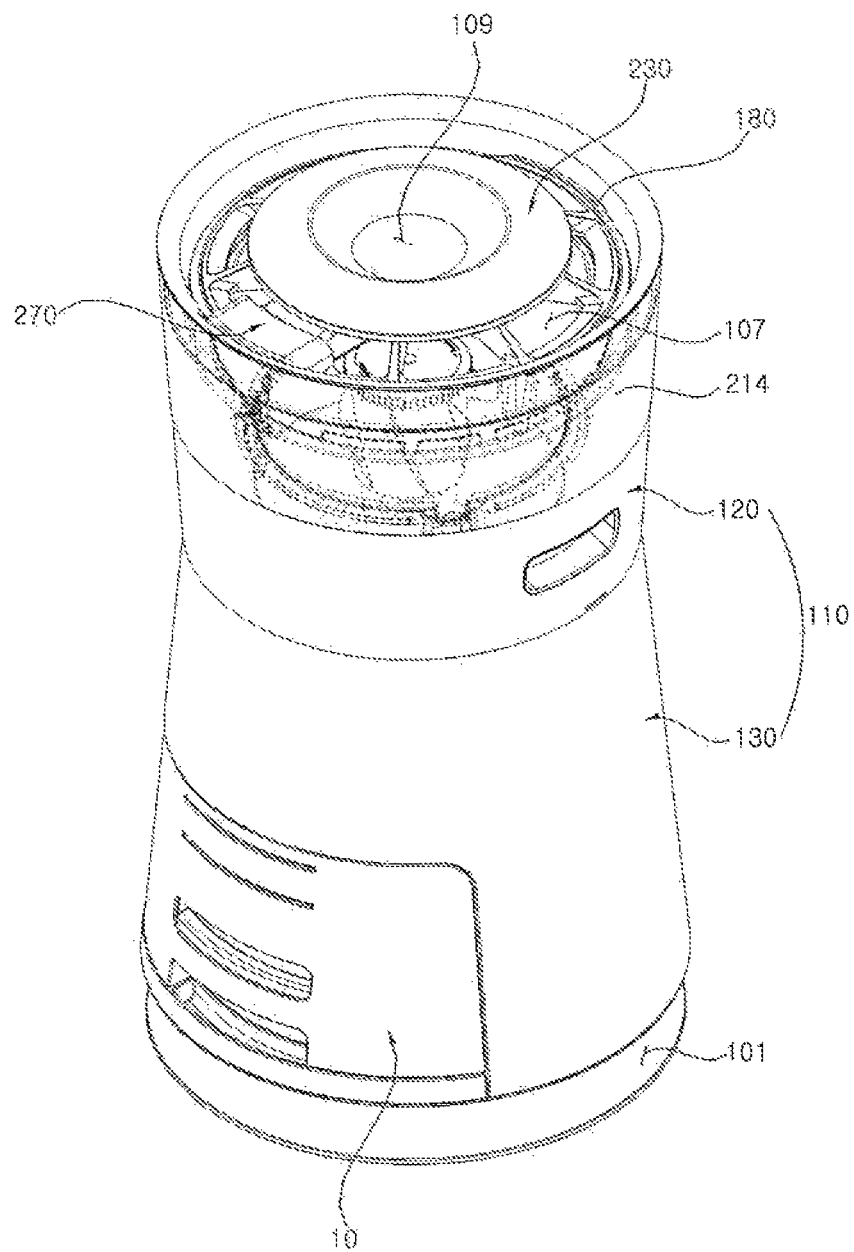
FIG. 1 is a perspective view of a humidification and air cleaning apparatus according to an embodiment.

Advantages and features of embodiments and methods of accomplishing the same will be more clearly understood from embodiments described below with reference to the accompanying drawings. However, the embodiments are not limited to the following embodiments but may be implemented in various different forms. The embodiments are provided only to complete disclosure and to fully provide a person having ordinary skill in the art to which embodiments pertains with a category, and embodiments will be defined by the scope of the appended claims. Wherever possible, like reference numerals generally denote like elements through the specification.

Hereinafter, embodiments will be described with reference to the accompanying drawings.

Figure 2:
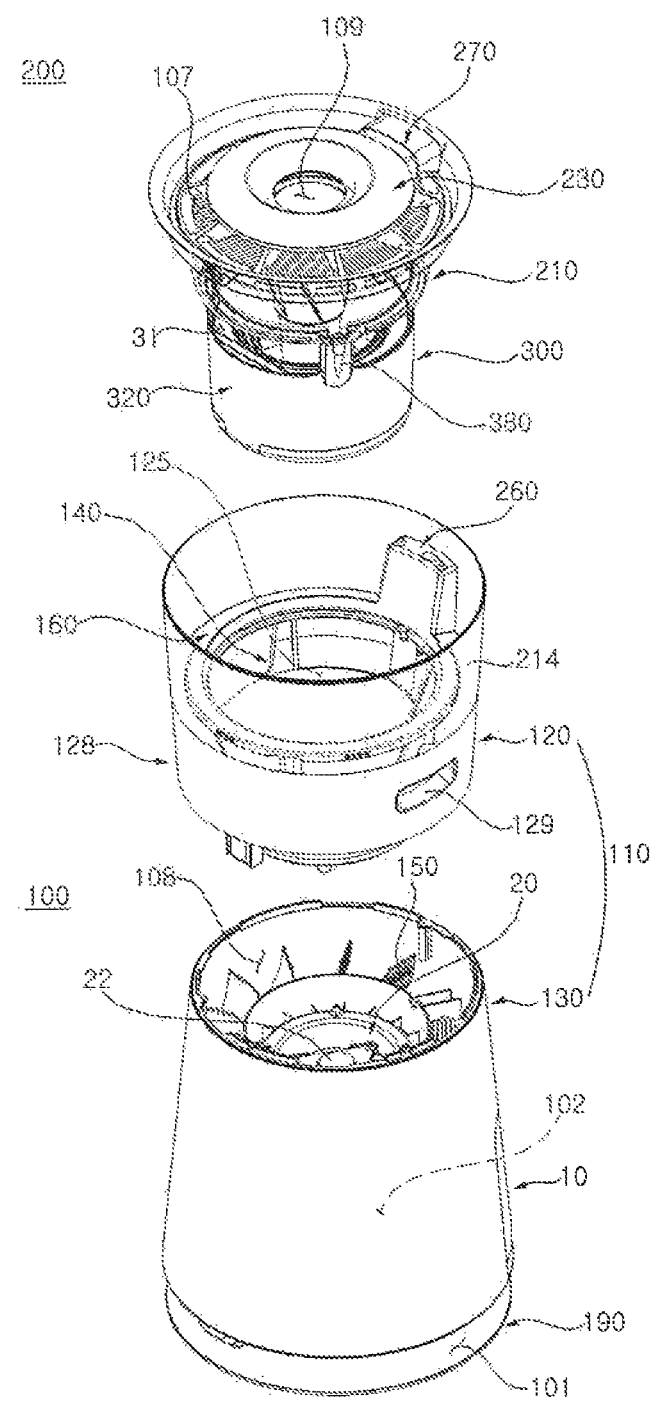
FIG. 2 is an exploded perspective view of the humidification and air cleaning apparatus of FIG. 1.
Figure 3:
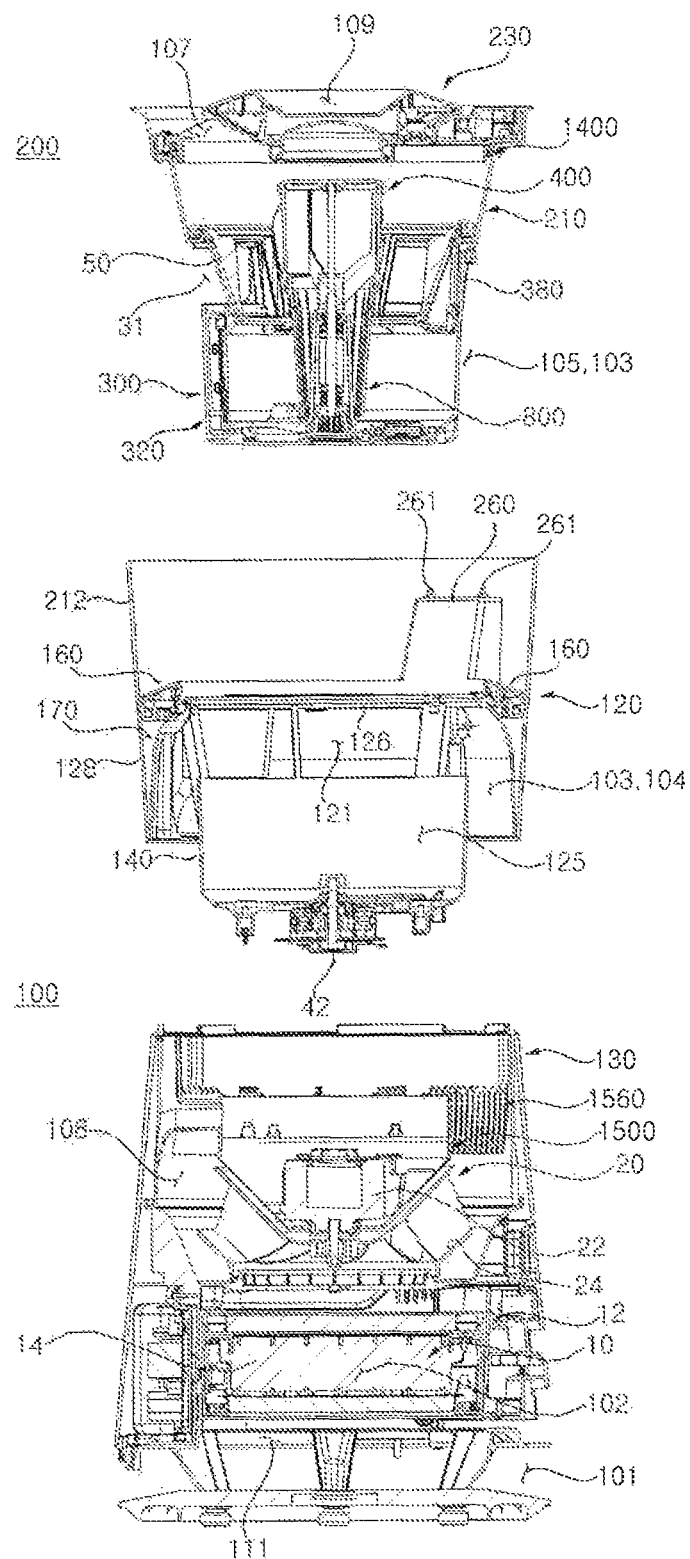
FIG. 3 is a front cross-sectional view of the humidification and air cleaning apparatus of FIG. 2.

FIG. 1 is a perspective view of a humidification and air cleaning apparatus according to an embodiment. FIG. 2 is an exploded perspective view of the humidification and air cleaning apparatus of FIG. 1. FIG. 3 is a front cross-sectional view of the humidification and air cleaning apparatus of FIG. 2.

Referring to FIGS. 1 to 3, an humidification and air cleaning apparatus according to this embodiment may include an air cleaning module 100 and an air humidification module 200 located over the air cleaning module 100.

The air cleaning module 100 may take in and filter external air, and may provide the filtered air to the air humidification module 200. The air humidification module 200 may be supplied with the filtered air, may humidify the filtered air to provide moisture, and may discharge the humidified air to the outside.

The air humidification module 200 may include a water tank 300 that stores water. When the air humidification module 200 is separated from the air cleaning module 100, the water tank 300 may be separated along with the air humidification module 200. The air humidification module 200 may be detachably located over the air cleaning module 100.

A user may upwardly separate the air humidification module 200 from the air cleaning module 100, and may easily clean the separated air humidification module 200. Further, the user may clean an interior of the air cleaning module 100, from which the air humidification module 200 is separated. When the air humidification module 200 is separated, a top surface of the air cleaning module 100 is open to the user.

The air cleaning module 100 may include a filter assembly 10, which will be described hereinafter, and the user may clean the air cleaning module 100 after separating the filter assembly 10 from a base body 110.

The user may supply water into the air humidification module 200. The air humidification module 200 may have a water supply passage 109, through which water may be supplied from outside to the water tank 300.

The water supply passage 109 may be formed separately from a discharge passage 107, through which air is discharged. Air to be discharged may be discharged through the discharge passage 107, and the discharge of air through the water supply passage 109 may be minimized or blocked.

The water supply passage 109 may be formed such that water may be supplied into the water tank 300 at any time. For example, even when the air humidification module 200 is in operation, water may be supplied through the water supply passage 109. For example, even when the air humidification module 200 is coupled to the air cleaning module 100, water may be supplied through the water supply passage 109. For example, even when the air humidification module 200 is separated from the air cleaning module 100, water may be supplied through the water supply passage 109. When water is supplied from above through the water supply passage 109, the water supplied from above may flow into the water tank 300 through the water supply passage 109.

The air cleaning module 100 and the air humidification module 200 may be connected to each other by a connection passage 103. As the air humidification module 200 is separable, the connection passage 103 may be distributedly provided over the air cleaning module 100 and the air humidification module 200. It is only when the air humidification module 200 is placed over the air cleaning module 100 that a flow passage of the air humidification module 200 and a flow passage of the air cleaning module 100 communicate with each other through the connection passage 103. The connection passage formed at the air cleaning module 100 may be defined as a cleaning connection passage 104, and the connection passage formed at the air humidification module 200 is defined as a humidification connection passage 105.

The air cleaning module 100 and the air humidification module 200 will be described hereinafter.

The air cleaning module 100 may include base body 110, filter assembly 10 disposed in the base body 110 and filtering air, and an air blower unit (air blower) 20 disposed in the base body 110 and blowing air. The base body 110 may include an upper body 120 and a lower body 130. The upper body 120 may be stacked on top of the lower body 130, and the upper body 120 and the lower body 130 may be assembled to each other.

Air may flow into the base body 110. An intake passage 101 may be disposed at a lower side of the lower body 130, and a filtering passage 102 may be disposed inside of the lower body 130, and an air flow passage 108 may be disposed at an upper side of the lower body 130.

In order to form the intake passage 101, a lower body supporter 190 may be disposed to support the lower body 130 from below. The filtering passage 102 may be disposed in the lower body 130 and pass through the filter assembly 10.

The air flow passage 108 may be disposed at an upper side of the air blower unit 20. The filtered air, discharged from the air blower unit 20, may flow into the water tank 300 through an air humidification inlet 31.

The filter assembly 10 may be detachably assembled to the base body 110. The filter assembly 10 includes the filtering passage 102, and filters outside air. The filter assembly 10 may be detached from the base body 10 in a horizontal direction. The filter assembly 10 may be disposed to intersect a flow direction of air that flows upstream in a vertical direction. The filter assembly 10 may slide in the horizontal direction and may filter air that flows upstream in the vertical direction. The filter assembly 10 may be disposed in the horizontal direction and may form the filtering passage 102 in the vertical direction. The filter assembly 10 may slide in the horizontal direction with respect to the base body 110.

The air blower unit 20 may be disposed above the filter assembly 10. The air blower unit 20 generates an air flow. The air blower unit 20 may be disposed inside of the base body 110 and may allow air to flow from a lower side to an upper side.

The air blower unit 20 may include a blower housing 1500, a blower motor 22, and a blower fan (not shown). In this embodiment, the blower motor 22 may be disposed at an upper side of the air blower unit 20, and the blower fan may be disposed at a lower side thereof. A motor shaft of the blower motor 22 may be disposed to face downward and may be coupled to the blower fan.

The blower housing 1500 may be disposed inside of the base body 110. The blower housing 1500 may provide a passage for flowing air. The blower motor 22 and the blower fan may be disposed in the blower housing 1500.

The blower housing 1500 may be disposed above the filter assembly 10 and below the upper body 120. The blower housing 1500 may have the air flow passage 108 formed therein. The blower fan may be disposed in the air flow passage 108. The air flow passage 108 may connect the filtering passage 102 and the cleaning connection passage 104.

An operating mechanism of the blower fan may be similar to a centrifugal fan, but a discharge direction of the blower fan may be inclined upward. In this embodiment, the blower fan draws in air from below, and then discharges the air outwardly and upwardly in a radial direction. An outer end of the blower fan may be disposed to be directed upward in the radial direction.

The blower motor 22 may be disposed above the blower fan to minimize contact with the flowing air. The blower motor 22 may be installed so as to be covered by the blower fan. The blower motor 22 is not located in the air flow passage formed by the blower fan, and does not generate resistance to the air blown by the blower fan.

The upper body 120 may form an exterior of the base body 110, and may be assembled to the upper side of the lower body 130. The air humidification module 200 may be detachably held in the upper body 120.

The upper body 120 may include an upper outer body 128 forming an exterior of the base body 110 and coupled to the lower body 130; an upper inner body 140 disposed inside of the upper outer body 128, having the water tank 300 inserted therein, and providing the connection passage 103; and an air guide 170 that connects the upper inner body 140 and the upper outer body 128 and guides air to the water tank 170. A water tank insertion space 125 may be formed inside of the upper inner body 140, and the water tank 300 of the air humidification module 200 may be detachably inserted into the water tank insertion space 125.

An outer side of the upper inner body 140 may communicate with the air flow passage 108. The upper inner body 140 may have an upper inlet 121 that passes through the inside and the outside of the upper inner body 140, and corresponding to the air humidification inlet 31. The air humidification inlet 31 may be disposed inside of the upper inlet 121.

The upper inlet 121 and the air humidification inlet 31 may allow the inside of the water tank 300 and the air flow passage 108 to communicate with each other. The upper inner body 140 has the water tank insertion space 125 so that the water tank 300 may be inserted therein.

As the upper body 120 is disposed to separate the connection passage 103 and the water tank insertion space 125, it is possible to minimize a flow of water in the water tank 300 into the connection passage 103. More particularly, the connection passage 103, divided by the upper inner body 140, may be disposed outside of a space in which water is stored, such that it is possible to prevent water from flowing into the connection passage 103.

The upper inner body 140 may have an open upper side, through which the water tank 300 may be inserted. The upper inner body 140 may form a portion of the cleaning connection passage 104, into which the filtered air may flow.

The upper inner body 140 may have the upper inlet 121 corresponding to the air humidification inlet 31. The upper inlet 121 is not an essential component, and may have any shape as long as the upper body 120 to expose the air humidification inlet 31 to the connection passage 103.

The air guide 170 may guide air, supplied through the cleaning connection passage 104, to the upper inlet 121. The air guide 170 may collect air inwardly which rises along the outside of the base body 110. The air guide 170 may change a flow direction of air flowing from a lower side to an upper side. While changing the flow direction of air, the air guide 170 may minimize an angle of change of the flow direction, so as to minimize flow resistance of air.

The air guide 170 may cover 360 degrees of the outside of the upper inner body 140 along a circumference of the upper inner body 140. The air guide 170 may guide air to the water tank 300 in all 360 degrees of directions of the circumference of the water tank 300. The air guide 170 may collect air inwardly which is guided along the outside of the lower body 130, and may supply the collected air to the water tank 300. With this structure, a flow rate of air supplied to the water tank 300 may be sufficiently secured.

A handle 129 may be formed at the upper body 120. As the air humidification module 200 is held in the upper body 120, the whole humidification and air cleaning apparatus may be lifted up by the handle 129.

The cleaning connection passage (not shown) may be disposed on the outside of the upper inlet 121, and the water tank insertion space 125 may be disposed on the inside thereof. The air, flowing through the cleaning connection passage 104, may pass through the upper inlet 121. When the water tank 300 is held in the water tank insertion space 125, the filtered air, having passed through the upper inlet 121, may flow into the water tank 300.

An outer visual body 214 may be coupled to an upper side of the upper body 120. The outer visual body 214 is a component of a visual body 210, but in this embodiment, the outer visual body 214 is fixed to the upper body 120. Unlike this embodiment, the outer visual body 214 may also be fixed to the air humidification module 200. Further, unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material, allowing a user to see inside of the outer visual body 214. The outer visual body 214 may be formed of a transparent or translucent material, for example.

A display module (display) 160 may be disposed at at least one of the air cleaning module 100 or the air humidification module 200 to display an operating state to a user. In this embodiment, the display module 160 may be disposed at the base body 110 to display an operating state of the humidification and air cleaning apparatus to a user.

The display module 160 may be disposed on an inner surface the outer visual body 214. The display module 160 may be disposed to be closely adhered to an inner surface of the outer visual body 214. When viewed from a top, the display module 160 may have a donut shape. The water tank 300 may be inserted into the display module 160.

The display module 160 may be supported by the outer visual body 214. An inner edge of the display module 160 may be supported by an upper inner body ring 126. The display module 160 may be integrally formed with a base connector 260. An inside of the display module 160 may be supported by the upper inner body 140, and the outside thereof may be supported by the outer visual body 218.

In this embodiment, when viewed from the top, the display module 160 has a ring shape. Unlike this embodiment, the display module 160 may have an arc shape. A surface of the display module 160 may be formed of, or coated with, a light-reflective material.

Accordingly, when drops of water are formed on the visual body 210, the water drops formed on the visual body 210 may be projected onto or reflected from the surface of the display module 160. When the water drops formed on the visual body 210 flow downward, a same effect is also shown on the display module 160. This effect may give a visual stimulus to a user, such that the user may intuitively recognize that humidification is being performed. The water drop image projected on the display module 160 may have not only an emotional effect of giving a sense of refreshment to a user, but also a functional effect of informing the user of a humidification state.

The display module 160 may have an inclined upper surface. The display module 160 may be inclined toward a user, such that a height of the display module 160 is higher on the inside than on the outside.

The humidification connection passage 105 may be disposed outside of a side wall of the water tank 300. The cleaning connection passage 104 may be disposed outside of the upper inner body 150.

Hereinafter, each component of the air humidification module 200 will be described with reference to FIG. 2 or FIG. 3.

The air humidification module 200 may include water tank 300 that stores water for humidification and detachably disposed on the air cleaning module 100; a water dispensing unit (dispenser) 400 disposed in the water tank 300 and spraying water in the water tank 300; a humidification medium 50 wetted with water sprayed from the water dispensing unit 400 and providing moisture to the flowing air; visual body 210 coupled to the water tank 300 and formed of a transparent material allowing a user to see the inside thereof; a top cover assembly 230 detachably disposed over the visual body 210 and providing the discharge passage 107, through which air is discharged, and the water supply passage 109 through which water is supplied; and a discharge vane 1400 disposed below the top cover assembly 230 and covering the discharge passage 107.

The air humidification module 200 provides humidification to the filtered air. The air humidification module 200 may implement a rain view inside of the water tank 300. The air humidification module 200 may spray and circulate water stored in the water tank 300. The air humidification module 200 may change the stored water into small droplets, and the scattered droplets may come into contact with the filtered air. Humidification and filtering may be performed while the filtered air is humidified with the scattered droplets.

The air humidification module 200 may include the water tank 300, the water dispensing unit 400, the humidification medium 50, the visual body 210, the top cover assembly 230, and handle 180. The handle 180 may be connected to the visual body 210, rotate in the visual body 210, and be held in the visual body 210. A user may simply lift up only the air humidification module 200 by the handle 180, and the handle 180 may be separated from the air cleaning module 100.

In the humidification and air cleaning apparatus according to this embodiment, a power source may be connected to the air cleaning module 100, and the air humidification module 200 may be supplied with power from the air cleaning module 100. As the air humidification module 200 may be separated from the air cleaning module 100, a separate power supply structure may be provided in which power is provided separately to the air cleaning module 100 and the air humidification module 200.

The air cleaning module 100 and the air humidification module 200 may be detachably assembled in the upper body 120, such that the base connector 260 for providing power to the air humidification module 200 may be disposed in the upper body 120. An operation module 240, which requires power, may be disposed at the top cover assembly 230 of the air humidification module 200. A top connector 270, detachably connected to the base connector 260, may be disposed in the air humidification module 200. The top connector 270 may be disposed in the top cover assembly 230.

In this embodiment, the top cover assembly 230 may be separated such that the inner surface of the visual body 210 or the inner surface of the water tank 300 may be cleaned in a convenient manner. The top cover assembly 230 may be detachably installed to the visual body 210. The top cover assembly 230 may be provided with the top connector 270 which may be electrically connected to the base connector 260.

When the top cover assembly 230 is placed on the visual body 210, the top connector 270 is disposed over the base connector 260. The top cover assembly 230 is supplied with electricity from the base connector 260 via the top connector 270.

A water level display unit (display) 247 that displays a water level of the water tank 300 may be disposed near the water supply passage 109. Accordingly, while supplying water, a user may check the water level of the water tank 300 which is not visible. By providing the water level display unit 247 at a position visible to a user while the user supplies water, it is possible to prevent excessive supply of water by the user or prevent overflow of water from the water tank 30.

The water level display unit 247 may be disposed at the top cover assembly 230. A separate power supply structure of the top connector 270 and the base connector 260 may allow effective supply of water from above.

The water tank 300 may be detachably disposed in the upper body 120. The water dispensing unit 400 may be disposed and rotate inside of the water tank 300.

The water tank 300 may include a water tank body 320 in which water is stored; the air humidification inlet 31 formed to pass through a side wall of the water tank body 320; and a water tank body extension part or portion (extension) 380 that extends upward from the water tank body 320 and coupled to the visual body 210.

The water tank body 320 has a bottom surface and a side wall, with an open upper part or portion (opening). The air humidification inlet 31 may pass through the side wall. In this embodiment, the water tank body 320 is formed in a cylindrical shape with an open upper portion. Unlike this embodiment, the water tank body 320 may be formed in various shapes.

The water tank body extension 380 may extend upward from the water tank 300. The water tank body extension 380 may form the air humidification inlet 31. The air humidification inlet 31 may be formed between the water tank body extensions 380.

The air humidification inlet 31 may pass through the side surface of the water tank body 320. The air humidification inlet 31 may be formed in all 360 degrees of directions of a circumference of the water tank body 320.

The water tank body extension 380 may guide water, flowing down from the inner surface of the visual body 210, into the water tank 300. By guiding water flowing down from the visual body 210, noise of dropping water may be minimized. The water tank body extension 380 may be coupled to a lower end of the visual body 210.

In this embodiment, the visual body 210 and the water tank 300 are manufactured separately and assembled afterwards. Unlike this embodiment, the visual body 210 and the water tank 300 may be integrally formed or the water tank 300 may be included in the visual body 210 as a component. For example, a portion of the water tank 300 may be formed of a transparent material by bi-injection molding, in which case the visual body 210 is not manufactured as a separate component.

In this embodiment, the air humidification inlet 31 is formed as a component of the water tank body 320. Unlike this embodiment, the air humidification inlet 31 may also be formed by providing the water tank body extension 380 in the visual body 210.

Further, unlike this embodiment, the air humidification inlet 31 may be formed in such a manner that some of a plurality of water tank body extensions 380 are disposed in the water tank 380 and the other are disposed in the visual body 210. In addition, unlike this embodiment, the air humidification inlet 31 may be formed as a separate component which is distinguished from the visual body 210 and the water tank 300. Moreover, unlike this embodiment, the visual body 210 may have an apertured surface, on which the air humidification inlet 31 may be formed, and the water tank 300 may also have an apertured surface on which the air humidification inlet 31 may be formed.

That is, the air humidification inlet 31 may be formed on either the water tank 300 or the visual body 210. The air humidification inlet 31 may be formed by coupling of the water tank 300 and the visual body 210. Upon providing the air humidification inlet 31 as a component which is distinguished from the water tank 300 and the visual body 210, the component may be disposed between the water tank 300 and the visual body 210. The air humidification inlet 31 may be formed by the coupling of the water tank 300 and the visual body 210.

The visual body 210 may have an upper part or portion and a lower part or portion which is open. When viewed from the top, the open upper portion and the open lower portion of the visual body 210 may have a circular shape. A diameter of the lower opening of the visual body 210 may be smaller than a diameter of the upper opening of the visual body 210.

In this embodiment, the top cover assembly 230 is inserted through the upper opening of the visual body 210, and is detachably disposed on the inner surface of the visual body 210.

The water dispensing unit 400 has a function of supplying water to the humidification medium 50. The water dispensing unit 400 has a function of visualizing the humidification process. The water dispensing unit 400 implements a rain view inside of the air humidification module 200.

The water dispensing unit 400 may draw in water stored in the water tank 300 by rotating humidification housing 800, pump upward the drawn water, and spray the pumped water outwardly in the radial direction. The water dispensing unit 400 may include the humidification housing 800 which draws in water, pumps upward the drawn water, and then sprays the pumped water outwardly in the radial direction.

In this embodiment, the humidification housing 800 may rotate to spray water. Unlike this embodiment, a nozzle may be used instead of the humidification housing 800 to spray water. As water is sprayed from the nozzle, the water may be supplied to the humidification medium 50 and a rain view may also be similarly implemented. Depending on embodiments, water may be sprayed from the nozzle or the nozzle may rotate.

The water sprayed from the humidification housing 800 serves to wet the humidification medium 50. The water sprayed from the humidification housing 800 may be sprayed toward at least either the visual body 210 or the humidification medium 50.

Water sprayed toward the visual body 210 may be used to implement a rain view. Water sprayed toward the humidification medium 50 may be used to humidify the filtered air. The rain view may be implemented by spraying water toward the visual body 210, and then water flowing down from the visual body 210 may be used to wet the humidification medium 50.

In this embodiment, a plurality of nozzles having different heights may be provided for the humidification housing 800. Water discharged from any one of the nozzles may form droplets on the inner surface of the visual body 210 to create a rain view, and water discharged from the other nozzle may wet the humidification medium 50 for use in humidification.

The humidification housing 800 may spray water to the inner surface of the visual body 210, and the sprayed water may flow down along the inner surface of the visual body 210. Droplets, shown in the form of drops of water, may be formed on the inner surface of the visual body 210, and a user may see the droplets through the visual body 210.

More particularly, water flowing down from the visual body 210 may wet the humidification medium 50 for use in humidification. The humidification medium 50 may be wetted with water sprayed from the humidification housing 800 and water flowing down from the visual body 210.

The visual body 210 may be coupled to the water tank 300, and may be disposed above the water tank 300. At least a portion of the visual body 210 may be formed of a material allowing a user to see the inside thereof.

The display module 160 may be disposed outside of the visual body 210. The display module 160 may be coupled to either one of the visual body 210 or the upper body 120.

The display module 160 may be disposed at a position at which the rain view may be observed by a user. In this embodiment, the display module 160 may be disposed at the upper body 120.

When the air humidification module 200 is placed on the visual body 210, an outer surface of the visual body 210 is closely adhered to the display module 160. At least a portion of the surface of the display module 160 may be formed of or coated with a light-reflective material.

The droplets formed on the visual body 210 may also be projected onto the surface of the display module 160. Accordingly, a user may observe motion of droplets at both the visual body 210 and the display module 160.

The water tank 300 may have the air humidification inlet 31 through which air passes. The air humidification inlet 31 may be provided between the connection passage 103 and a humidification passage 106. The air humidification inlet 31 may be an outlet of the connection passage 103 and an inlet of the humidification passage 106.

The filtered air, supplied from the air cleaning module 100, may flow into the air humidification module 200 (water tank in this embodiment) through the air humidification inlet 31. The humidification medium 50 may be disposed at the air humidification inlet 31 and may cover the air humidification inlet 31.

The humidification medium 50 may be disposed at at least one of the following positions: on a same plane as the air humidification inlet 31, or on the outside or the inside of the air humidification inlet 31. The humidification medium 50 is wetted with water for humification, such that the humidification medium 50 is desirably disposed inside the air humidification inlet 31. That is, the humidification medium 50 is desirably disposed on the inside of the water tank 300.

Water flowing down after wetting the humidification medium 50 is stored in the water tank 300. The humidification medium 50 humidifies the filtered air passing through the air humidification inlet 31.

The filtered air is humidified by water naturally evaporated from the humidification medium 50. The term "natural evaporation" means that water evaporates in a state in which separate heat is not applied to the water. Natural evaporation may be promoted as contact with air increases, a flow velocity of air increases, and a pressure in the air decreases. Natural evaporation may also be referred to as "natural vaporization".

The humidification medium 50 may promote the natural evaporation of water. In this embodiment, the humidification medium 50 is wetted with water but is not immersed in the water tank 300.

The humidification medium 50 may be spaced apart from the water stored in the water tank 300, such that even when water is stored in the water tank 300, the humidification medium 50 is not always in a wet state. That is, the humidification medium 50 may be in a wet state only during operation of a humidification mode, and during operation of an air cleaning mode, the humidification medium 50 may be maintained in a dry state.

The humidification medium 50 may cover the air humidification inlet 31, and the filtered air may pass through the humidification medium 50 to flow into the water tank 300. As the filtered air passes through the air humidification inlet 31, an air flow length may be minimized.

Figure 4:
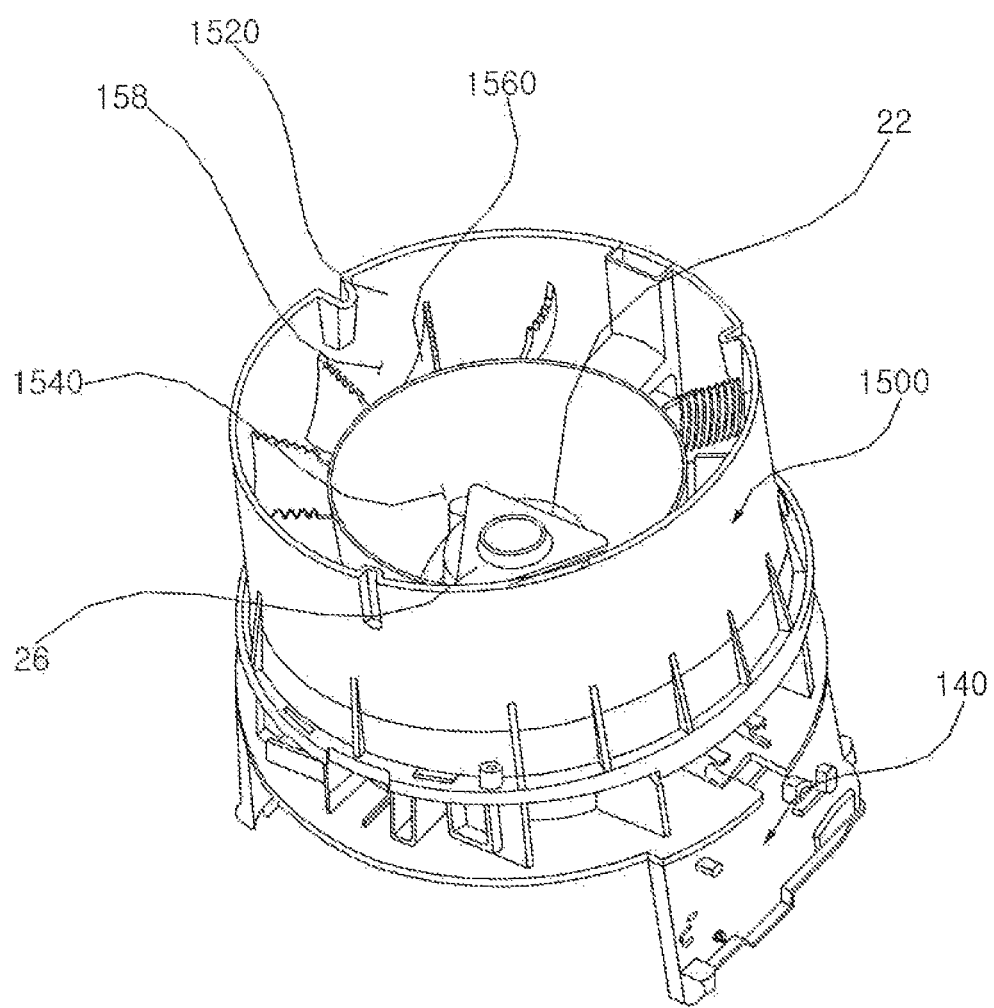
FIG. 4 is an assembled perspective view of a blower housing and a filter housing disposed in a base body of FIG. 1.
Figure 5:
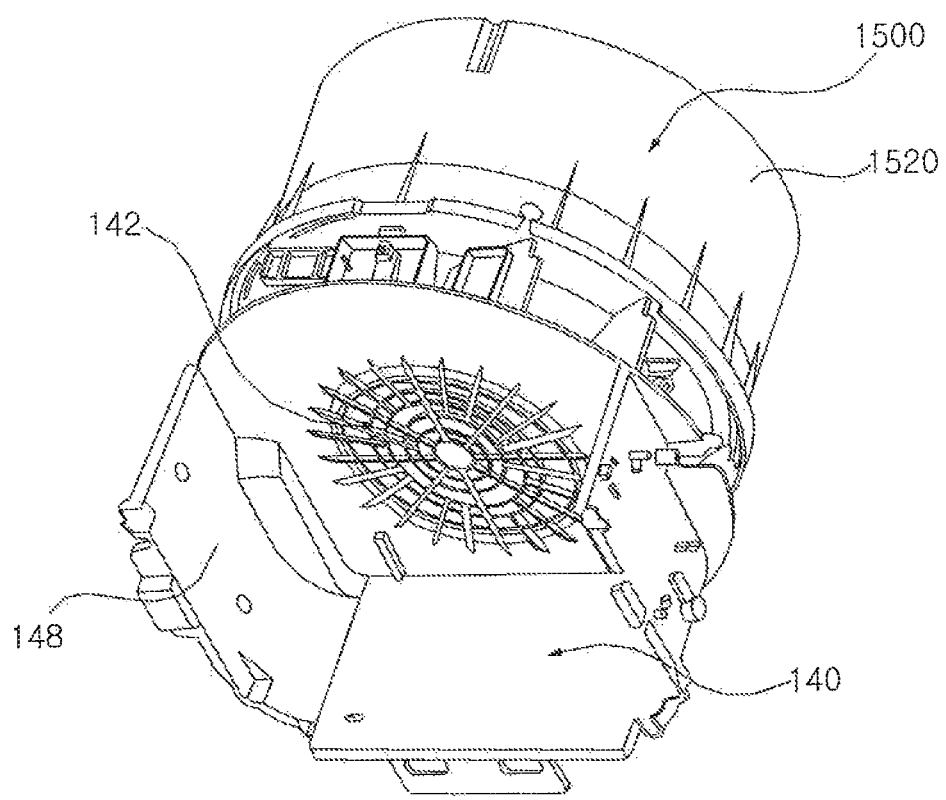
FIG. 5 is a perspective view as seen from a bottom of the blower housing and filter housing of FIG. 4.
Figure 6:
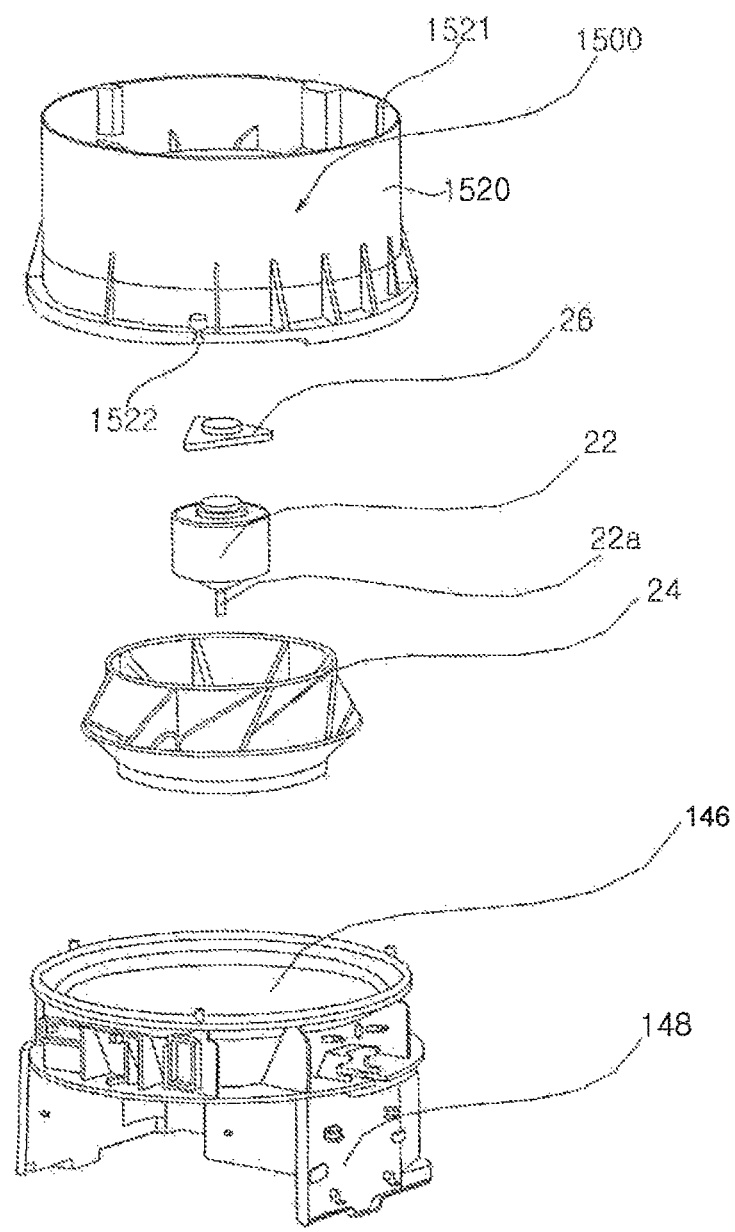
FIG. 6 is an exploded perspective view of the blower housing and filter housing of FIG. 4.

FIG. 4 is an assembled perspective view of a blower housing and a filter housing being disposed in a base body of FIG. 1. FIG. 5 is a perspective view as seen from a bottom of the blower housing and filter housing of FIG. 4. FIG. 6 is an exploded perspective view of the blower housing and filter housing of FIG. 4.

An air conditioner according to an embodiment may include the blower housing 1500 having the blower motor 22 coupled thereto, and an annular air flow passage 158 through which air discharged from the blower fan 24 flows; and the filter housing 140 which is coupled to the blower housing 1500 and into which a lower portion of the blower fan 24 is inserted. The filter housing 140 may be disposed inside of the lower body 130. The filter housing 140 may be coupled to an upper side of the base 112. The filter housing 140 may be coupled to a lower side of the blower housing 1500. The filter housing 140 may have the filter assembly 10 inserted therein and guide air, having passed through the filter assembly 10, to the blower fan 24.

The filter housing 140 may include a filter mounting part or portion (mount) 148 which may be disposed at a lower side thereof and into which the filter assembly 10 may be detachably inserted; and a flow guide 146 which is disposed at an upper side thereof and in which a lower portion of the blower fan 24 is received. The filter housing 140 may have a circular inlet 142 through which air, purified by passing through the filter assembly 10 disposed between the filter mounting portion 148 and the flow guide 146, flows to the blower fan 24. The filter housing 140 may have a grille formed in a radial shape on the inlet 142.

The blower housing 1500 may be disposed inside of the lower body 130. The blower housing 1500 may be coupled to an upper side of the filter housing 140. Further, the blower housing 1500 may be disposed at a lower side of the upper inner body 140 and be coupled to the lower side of the upper body 120. The blower housing 1500 may support the blower motor 22 and guide air, discharged from the blower fan 24, to the upper body 120.

The blower housing 1500 may include an outer housing 1520 forming an exterior thereof and having a cylindrical shape; and an inner housing 1540 disposed at a center portion of the outer housing 1520, and having a bowl shape and the blower motor 22 inserted therein. The blower housing 1500 may have the annular air flow passage 158, which may be formed between the outer housing 1520 and the inner housing 1540, and through which air discharged from the blower fan 24 may flow. The blower housing 1500 may include a plurality of diffuser blades 1560 being spaced apart from each other in a circumferential direction on the air flow passage 158.

The blower unit 20 may include a motor coupling part or portion 26 disposed at an upper side of the blower motor 22 and coupled to the inner housing 1540 to connect the blower motor 22 to the inner housing 1540. The blower motor 22 generates torque to rotate the blower fan 24. The blower motor 22 may be disposed in the inner housing 1540 of the blower housing 1500. The blower motor 22 may be connected to the inner housing 1540 of the blower housing 1500 by the motor coupling portion 26. The blower motor 22 has a rotational shaft 22a which rotational with the torque. The rotational shaft 22a of the blower motor 22 may pass through a center of a lower end of the inner housing 1540 to be coupled to the blower fan 24.

The blower fan 24 may be rotated by the blower motor 22 to blow air. The blower fan 24 allows air, introduced into the inlet 142 of the filter housing 140, to flow to be discharged through the air flow passage 158. In this embodiment, the blower fan 24 rotates in a clockwise direction, when viewed from the top.

The blower fan 24 may be a centrifugal fan which draws in air in a direction of the rotational shaft and discharges the air in the radial direction. Compared to other types of fans, the centrifugal fan may maximize air volume when a rotational speed and size are the same, and air may be discharged through the annular air flow passage 158. In this embodiment, however, the blower fan 24 is a centrifugal fan modified such that air is discharged in an upwardly inclined direction.

The blower fan 24 may be disposed below the blower motor 22. An upper portion of the blower fan 24 may be disposed on the outside of the inner housing 1540 of the blower housing 1500. That is, a lower portion of the inner housing 1540 may be inserted into the upper portion of the blower fan 24. A lower portion of the blower fan 24 may be inserted into the flow guide 146 of the filter housing 140. A lower end of the blower fan 24 may be disposed adjacent to the inlet 142 of the filter housing 140. The rotational shaft 22a of the blower motor 22 may be coupled to the center of the blower fan 24.

Figure 7:
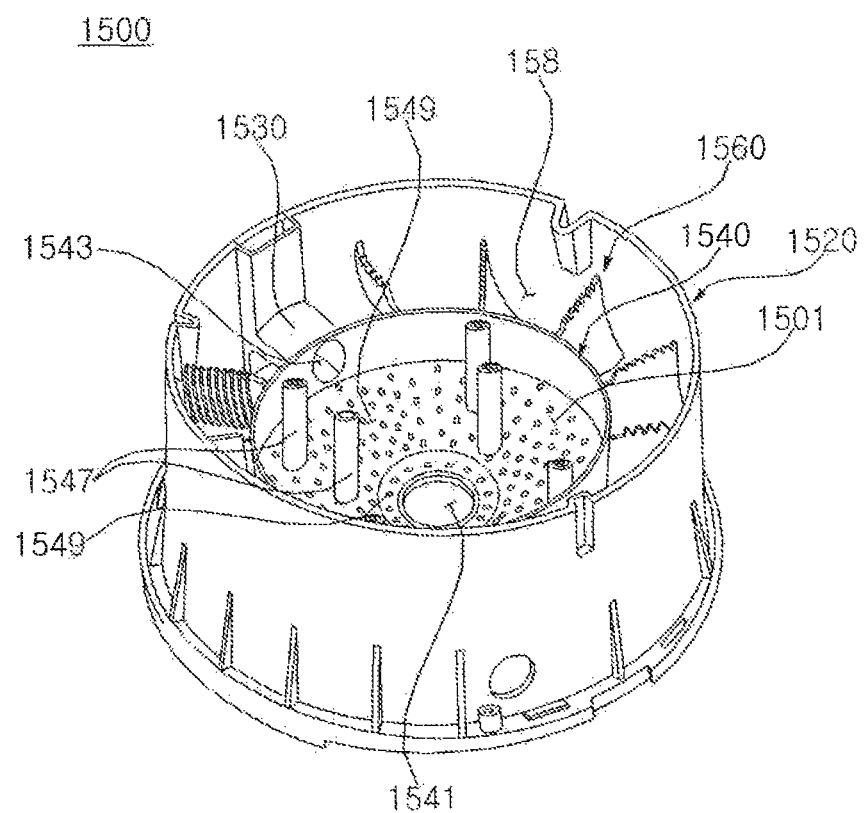
FIG. 7 is a perspective view of the blower housing of FIG. 4.
Figure 8:
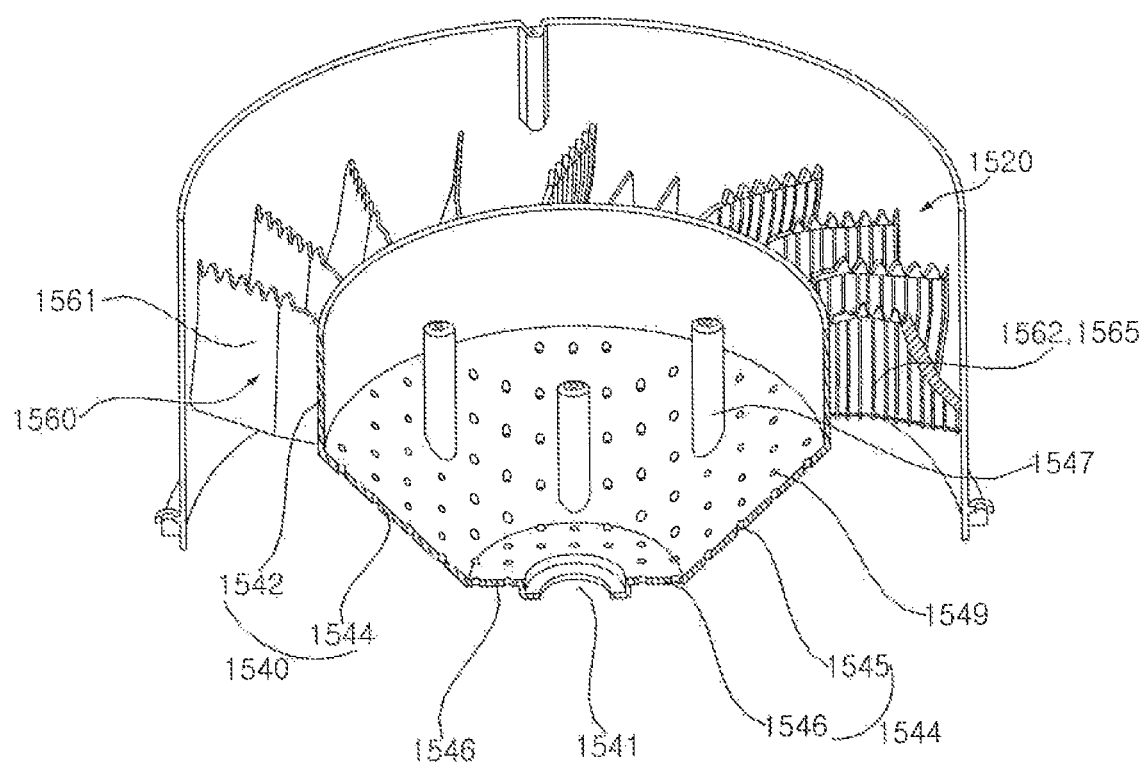
FIG. 8 is a partial cross-sectional perspective view of the blower housing of FIG. 7.
Figure 9:
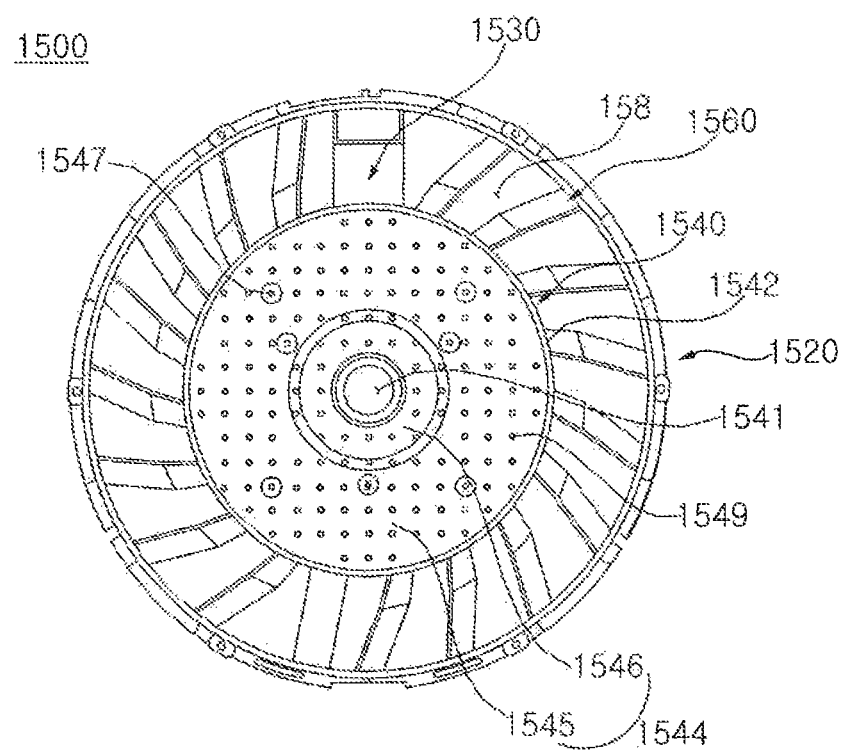
FIG. 9 is a plan view of the blower housing of FIG. 7.
Figure 10:
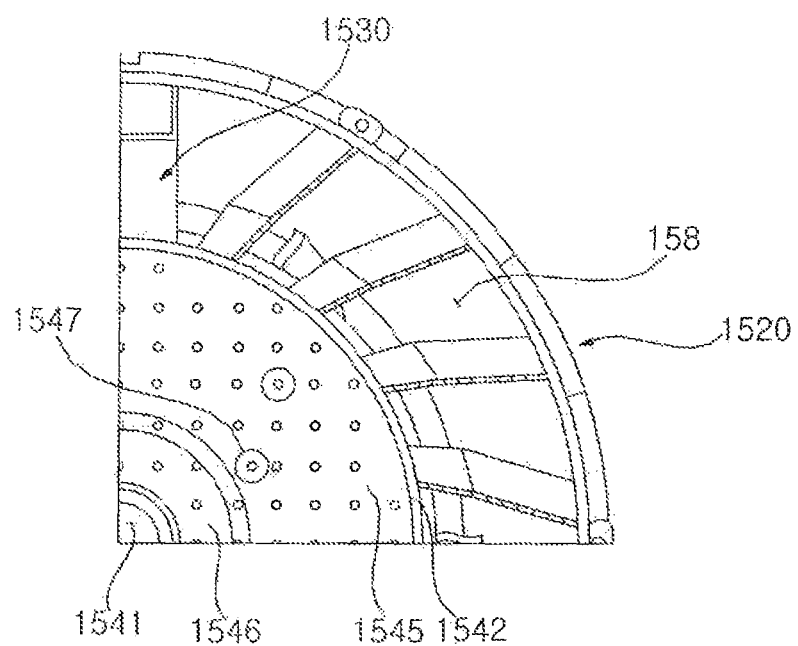
FIG. 10 is a partially magnified view of the blower housing of FIG. 9.
Figure 11:
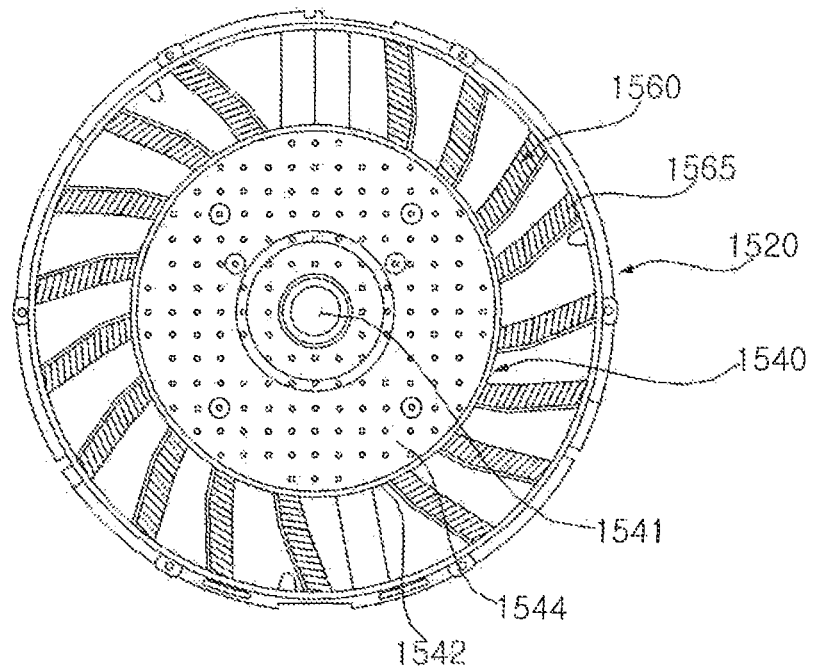
FIG. 11 is a bottom view of the blower housing of FIG. 7.

FIG. 7 is a perspective view of the blower housing of FIG. 4. FIG. 8 is a partial cross-sectional perspective view of the blower housing of FIG. 7. FIG. 9 is a plan view of the blower housing of FIG. 7. FIG. 10 is a partially magnified view of the blower housing of FIG. 9. FIG. 11 is a bottom view of the blower housing of FIG. 7.

The outer housing 1520 may be formed in a cylindrical shape and have an upper part or portion and a lower part or portion which are open. A lower end 1522 of the outer housing 1520 may be assembled to the filter housing 140, and an upper end 1521 of the outer housing 1520 may be assembled to the upper body 120.

The air flow passage 158 may be formed on the inside of the outer housing 1520. The inner housing 1540 may be formed inside of the outer housing 1520. An outer surface of the inner housing 1540 may be spaced apart from an inner surface of the outer housing 1520, and the inner housing 1540 and the outer housing 1520 may be connected by the plurality of diffuser blades 1560.

An overall shape of the inner housing 1540 may be a bowl shape with an open upper side. The inner housing 1540 may include a side cover 1542 disposed to face the outer housing 1520, and having an upper side and a lower side which are open; a bottom cover 1544 connected to a lower end of the side cover 1542 and having a bowl shape with an open upper side; and a shaft hole 1541 through which the rotational shaft 22a of the blower motor 22 may vertically pass. In this embodiment, the side cover 1542 is formed in a cylindrical shape, and is parallel to the outer housing 1520.

An upper end and a lower end of the side cover 1542 are located within a height of the outer housing 1520. The side cover 1542 may be disposed vertically.

A cable bridge 1530 may be disposed between the side cover 1542 and the outer housing 1520. A cable (not shown) may be disposed inside of the cable bridge 1530 and connected to the air blower unit 20. A hole 1543 that penetrates from an inside to an outside of the side cover 1542 may be formed, and the cable may be inserted through the hole 1543.

As the cable bridge 1530 is disposed across the air flow passage 158, air resistance may be generated. In order to minimize the air resistance, a lower surface of the cable bridge 1530 may have a rounded shape. In this embodiment, the cable bridge 1530 is formed in a semi-cylindrical shape which is downwardly convex.

The bottom cover 1544 may include an inclined cover 1545 having an upper end being connected to the lower end of the side cover 1542 and a lower end being inclined downwardly toward the rotational shaft 22*a*; and a flat cover 1546 lying flat at the lower end of the inclined cover 1545. The inclined cover 1545 may have a hopper shape with a cross-sectional area decreasing toward the lower side thereof. In this embodiment, the shaft hole 1541 is formed to pass through the inclined cover 1545 in the vertical direction.

The shaft hole 1541 may be formed at an axial center of the inner housing 1540 and the outer housing 1520. The shaft hole 1541 may be closed when the blower motor 22 is assembled.

An outer surface of the inner housing 1540 comes into contact with air, and the blower motor 22 is installed inside of the inner housing 1540. The blower fan 24 may be disposed below the blower motor 22, and the blower fan 24 causes air to flow upward from the lower side.

Accordingly, as a lower surface of the inclined cover 1545 and a lower surface of the flat cover 1546 come into contact with air, it is desirable to minimize bending of the surfaces. The inclined cover 1545 may form an angle of inclination toward the rotational shaft 22*a* and be formed with a smooth curved surface.

A space formed inside of the inner housing 1540 may be defined as a motor installation space 1501. The blower motor 22 may be disposed in the motor installation space 1501, such that direct contact with the flowing air is prevented.

Bosses 1547 may be disposed in the inner housing 1540 to fix the blower motor 22. In this embodiment, the bosses 1547 are disposed at the bottom cover 1544.

A plurality of bosses 1547 may be provided, some of which may be coupled to the upper inner body 140 and support the upper body 120, and the rest of the bosses 1547 may be used to assemble the blower motor 22.

More specifically, the bosses 1547 may protrude upward from an upper surface of the inclined cover 1545. In this embodiment, the bosses 1547 are assembled with the motor coupling portion 26 by a coupling member (not shown).

A plurality of holes 1549 may be formed which pass through the bottom cover 1544 in the vertical direction. The holes 1549 allow a lower side and the inside of the inner housing 1540 to communicate with each other, such that a portion of air flowing during operation of the blower fan 24 may flow into the motor installation space 1501. The air flowing into the motor installation space 1501 through the holes 1549 may cool the blower motor 22. In addition, water introduced into the motor installation space 1501 may be drained downwardly through the holes 1549.

Under normal conditions, water in the water tank 300 does not flow into the base body 110. However, when the water tank 300 is separated or replaced, water may be stored in the water tank insertion space 125 of the upper inner body 140. In general cases, water stored in the water tank insertion space 125 is not drained downwardly, but there is a possibility that the stored water may leak downwardly through a crack occurring in the upper inner body 140 or through a coupling hole, for example.

Accordingly, water leaking downwardly from the upper inner body 140 may fall down to the blower housing 1500, and the leaking water may be drained through the holes 1549 toward the filter housing 140. The filter housing 140 has a flow passage for draining water, flowing downward, to the outside by self-weight.

Further, the diffuser blades 1560 connect the outer housing 1520 and the inner housing 1540. An inner end of the diffuser blade 1560 may be coupled to the outer surface of the inner housing 1540, and an outer end of the diffuser blade 1560 may be coupled to the inner surface of the outer housing 1520.

An arrangement direction of the plurality of diffuser blades 1560 is related to a rotational direction of the blower fan 24. When viewed from the top, the blower fan 24 rotates in a clockwise direction, such that the diffuser blades 1560 are arranged in a clockwise direction. More specifically, the inner end of the diffuser blade 1560 is coupled to the side cover 1542.

When viewed from the top, the plurality of diffuser blades 1560 are disposed radially about the rotational axis 22*a*. When viewed from the top, the diffuser blades 1560 may be disposed radially about the shaft hole 1541.

The diffuser blades 1560 may be disposed above the bottom cover 1544. Air, guided upward along the lower surface of the bottom cover 1544, may be guided through the diffuser blades 1560.

When viewed from the top, the side cover 1542 may be formed in a circular shape, such that the outer surface of the side cover 1542 and the inner end of the diffuser blades 1560 form a first sweep angle. When viewed from the top, the outer housing 1520 may be formed in a circular shape, such that the inner surface of the outer housing 1520 and the outer end of the diffuser blade 1560 form a second sweep angle.

When the diffuser blade 1560 is cut longitudinally, a longitudinal section of the diffuser blade 1560 may be formed in a shape of an airfoil in a direction from the lower side to the upper side. A surface in a direction in which air flows from the diffuser blades 1560 may be defined as a constant-pressure surface 1561, and an opposite surface to the constant-pressure surface 1561 may be defined as a suction surface 1562. In this embodiment, a plurality of ribs 1565 may be further formed on the suction surface 1562 of the diffuser blades 1560.

The plurality of ribs 1565 may protrude from the suction surface 1562 of the diffuser blades 1560 and extend in a longitudinal direction of the diffuser blades 1560. The ribs 1565 may extend in an air flow direction.

Each of the plurality of ribs 1565 may be formed in the shape of an airfoil, in which a height of a cross-section decreases from a front end (lower side) toward a rear end (upper side). Each of the plurality of ribs 1565 may have a convex shape in a bent direction of the suction surface 1562. The plurality of ribs 1565 may have formed on the suction surface 1562 and suppress formation of a vortex on the suction surface 1562 of the diffuser blades 1560. Grooves 1566, having a smaller width than that of the ribs 1565, may be formed between the respective ribs 1565. In addition, the upper end of each of the plurality of diffuser blades 1560 may be formed in the shape of a saw tooth 1567.

Figure 12:
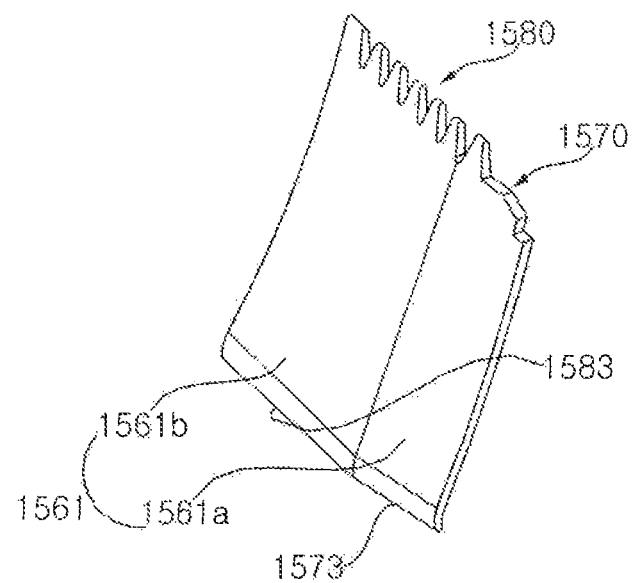
FIG. 12 is a perspective view of a diffuser blade of FIG. 8.
Figure 13:
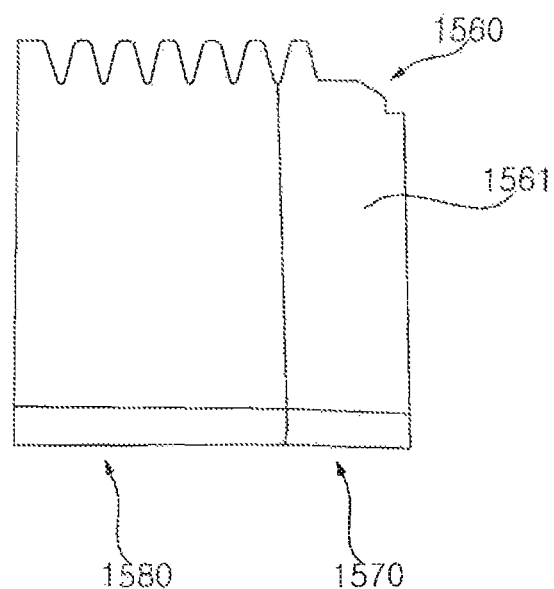
FIG. 13 is a front view of the diffuser blade of FIG. 12.
Figure 14:
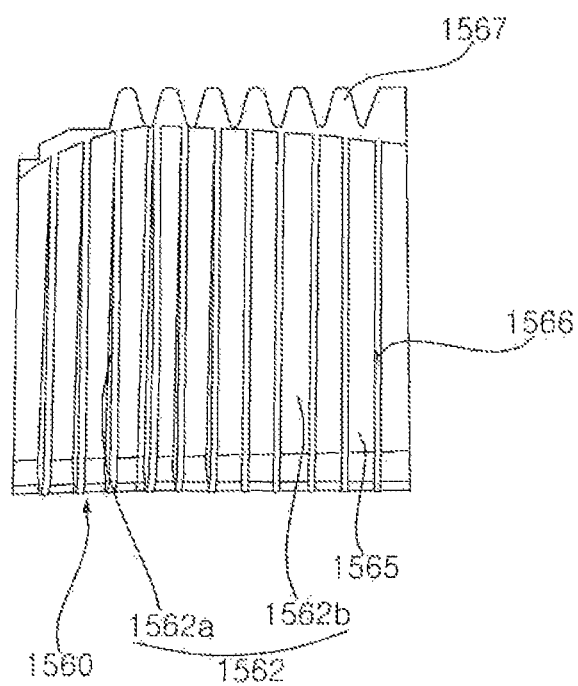
FIG. 14 is rear view of the diffuser blade of FIG. 12.
Figure 15:
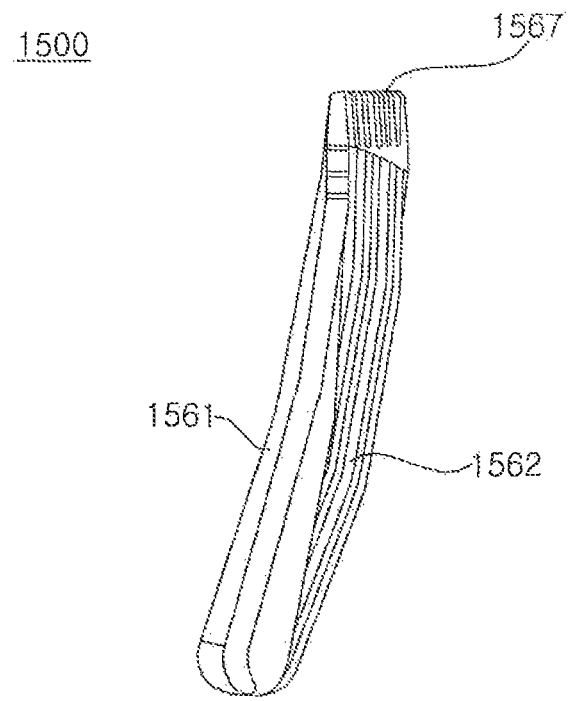
FIG. 15 is a side view of the diffuser blade of FIG. 12.
Figure 16:
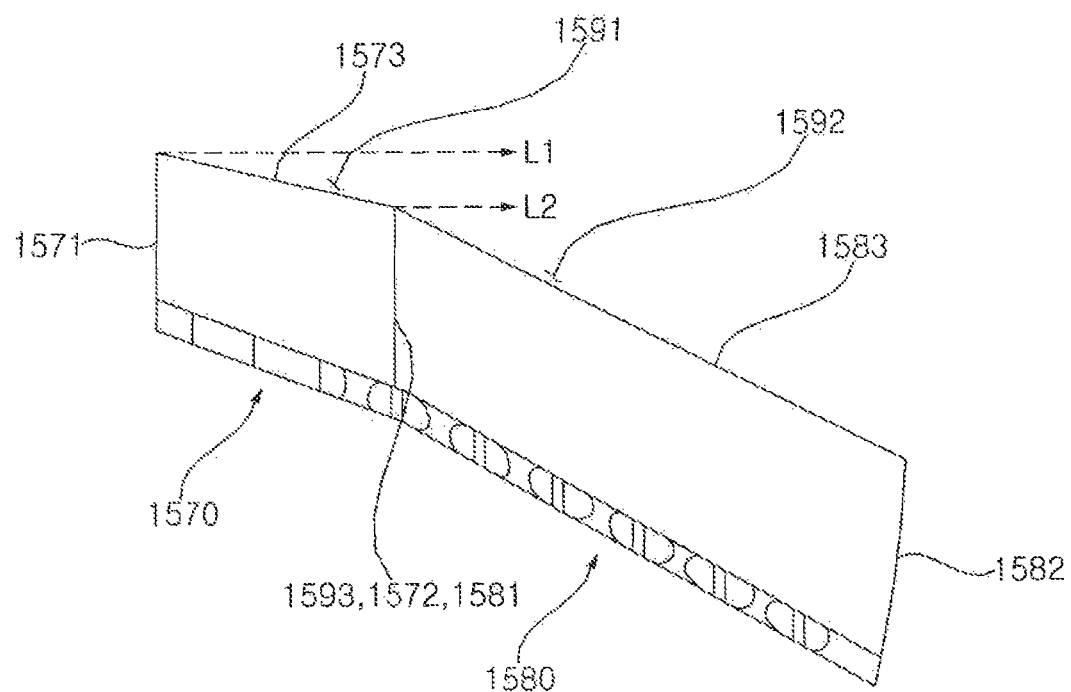
FIG. 16 is a plan view of the diffuser blade of FIG. 12.
Figure 17:
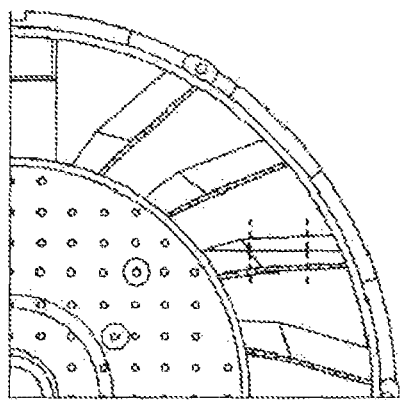
FIG. 17 is a diagram illustrating a table of power consumption and noise according to a position of a change portion.
Figure 17:
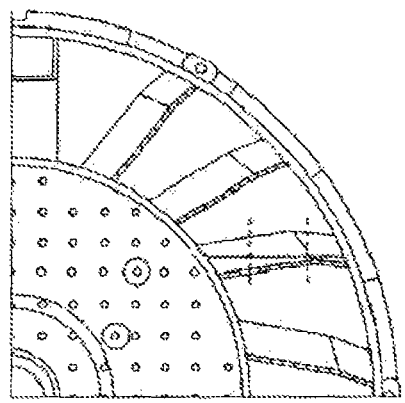
Figure 18:
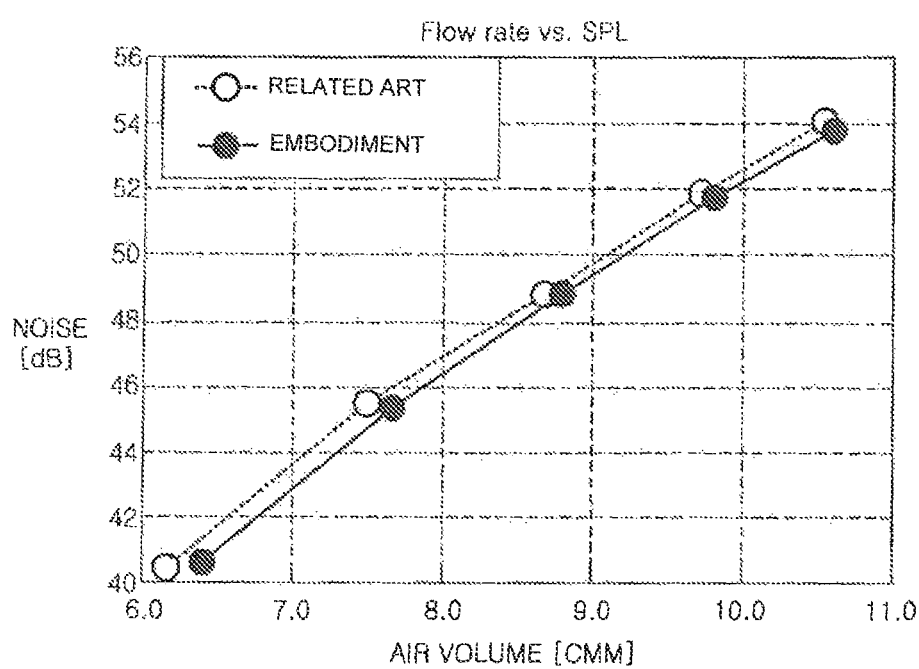
FIG. 18 is a diagram illustrating a graph of air volume versus noise in a comparison of an embodiment of the present disclosure and a general technique.
Figure 19:
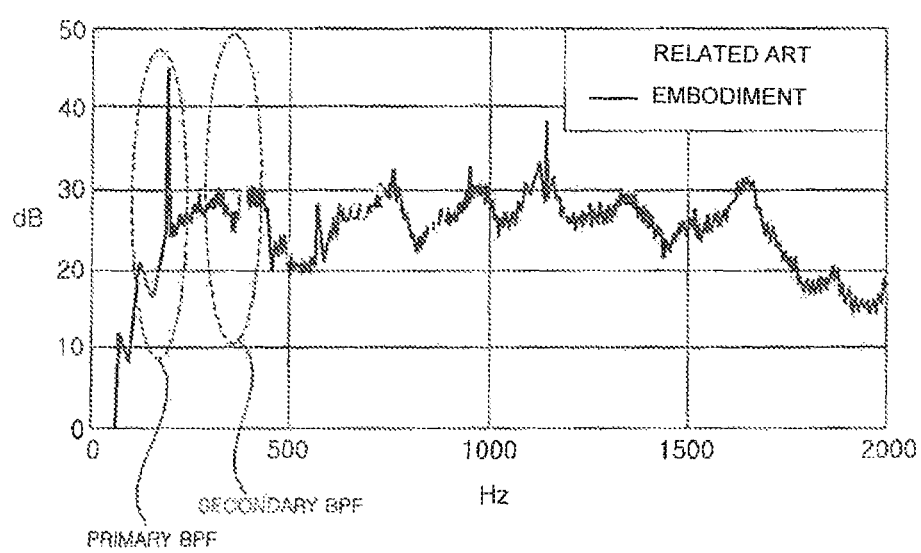
FIG. 19 is a diagram illustrating a graph of frequency versus decibel in a comparison of an embodiment and a general technique.

FIG. 12 is a perspective view of a diffuser blade of FIG. 8. FIG. 13 is a front view of the diffuser blade of FIG. 12. FIG. 14 is rear view of the diffuser blade of FIG. 12. FIG. 15 is a side view of the diffuser blade of FIG. 12. FIG. 16 is a plan view of the diffuser blade of FIG. 12. FIG. 17 is a diagram illustrating a table representing power consumption and noise according to a position of a change portion. FIG. 18 is a diagram illustrating a graph of air volume versus noise in a comparison of an embodiment of the present disclosure and a general technique. FIG. 19 is a diagram illustrating a graph of frequency versus decibel in a comparison of an embodiment of the present disclosure and a general technique.

The diffuser blades 1560 will be described below with reference to FIGS. 12 to 16.

The diffuser blades 1560 may include a first blade 1570 having an inner end coupled to the inner housing 1540; and a second blade 1580 having an outer end coupled to the outer housing 1520 and an inner end coupled to the first blade 1570. When viewed from a direction of an axis of rotation of the blower fan, a point (change portion 1593) between ends (inner and outer ends) of the diffuser blade 1560 may deviate from an arbitrary line connecting the ends of the diffuser blade 1560. When cut longitudinally, the first blade 1570 and the second blade 1580 may be formed in the shape of an airfoil in a direction from a lower side to an upper side.

The first blade 1570 and the second blade 1580 may be integrally formed with each other. Ribs 1565 and grooves 1567 may be formed on respective suction surfaces 1562a and 1562b of the first blade 1570 and the second blade 1580.

An inner end of the first blade 1570 may be coupled to an outer surface of the inner housing 1540, and an outer end of the first blade 1570 may be coupled to an inner end of the second blade 1580. The inner end of the second blade 1580 may be coupled to the outer end of the first blade 1570, and the outer end of the second blade 1580 may be coupled to the inner surface of the outer housing 1520.

When viewed from the top, the first blade 1570 and the second blade 1580 may be disposed such that constant-pressure surface 1561 thereof is viewed more, and suction surface 1562 is inclined downwardly.

The first blade 1570 and the inner housing 1540 form a first sweep angle 1591, and the first blade 1570 and the second blade 1580 form a second sweep angle 1592. The first blade 1570 and the second blade 1580 form an included angle. The included angle may be greater than 90 degrees and less than 180 degrees.

More particularly, when viewed from the top, the first blade 1570 and the second blade 1580 form the included angle, which is an angle obtained by subtracting the first sweep angle from the second sweep angle ("second sweep angle–first sweep angle"). More specifically, the front end 1573 of the first blade 1570 and the front end 1583 of the second blade 1580 may form the included angle. That is, rather than forming a continuous plane or a curved surface, the first blade 1570 and the second blade 1580 according to this embodiment have a bent portion formed in the middle.

When viewed from the top, an angle, formed between a virtual normal line L1 with respect to the rotational shaft 22a or a virtual normal line L1 with respect to a plane center of the blower housing 1500 and the edge of the first blade 1570, may be defined as the first sweep angle 1591. Further, when viewed from the top, an angle formed between the normal line L1 and the edge of the second blade 1580 may be defined as the second sweep angle 1592. The second sweep angle 1592 may be an angle formed between a virtual normal line L2, being parallel to the normal line L1 and passing through the change portion 1593 to be described hereinafter, and the edge of the second blade 1580. The virtual normal line L2 may be directed toward the rotational shaft 22a.

More specifically, the first sweep angle 1591 is the angle between the front end 1573 of the first blade 1570 and the normal line L1. The front end 1573 is the edge first coming into contact with the discharged air, and is the lower end of the first blade 1570 in this embodiment. Likewise, the second sweep angle 1592 is the angle between the front end 1583 of the second blade 1580 and the normal line L1. The front end 1583 is the edge first coming into contact with the discharged air, and is the lower end of the second blade 1580 in this embodiment.

If it is necessary to distinguish between the front ends, the front end of the first blade 1570 is defined as first front end 1573, and the front end of the second blade 1580 is defined as second front end 1583.

The first sweep angle 1591 rotates about the normal line L1 in a same direction as the rotational direction of the blower fan. The second sweep angle 1592 rotates further than the first sweep angle 1591 in the rotational direction of the blower fan.

When viewed from the top, the first front end 1573 is disposed closer to the normal line L1 than the second front end 1583. The second sweep angle 1592 is greater than the first sweep angle 1591. The second sweep angle 1592 may be two to four times greater than the first sweep angle 1591.

In this embodiment, the diffuser blades 1560 form dual sweep angles, thereby reducing noise caused by the discharged air, and reducing power consumption. As the diffuser blades 1560 form dual sweep angles, a phase difference is formed in the discharged air while the air passes through the diffuser blades 1560, and the phase difference in the discharged air may reduce peak noise occurring due to specific overlapping frequencies.

More particularly, it is desirable to reduce collision of air with the diffuser blades 1560 on the radially outer side where the air flows at a high speed. In this embodiment, by forming a greater second sweep angle 1592 of the second blade 1580, the collision with the discharged air may be reduced more effectively.

The second sweep angle 1592 is formed at a connection portion between the first blade 1570 and the second blade 1580 of the diffuser blades 1560. The connection portion, at which the first sweep angle 1591 changes to the second sweep angle 1592, between the first blade 1570 and the second blade 1580 is defined as the change portion (t) 1593.

In this embodiment, the position (t) of the change portion 1593 satisfies the following expression: "radius of the blower fan<t<radius of the blower fan+(radius of the internal passage–radius of the blower fan)/2".

The radius of the internal passage is the radius of the outer housing 1520 in this embodiment. Accordingly, the change portion 1593 is disposed on a radially outer side of the blower fan 24 and is disposed inside of the outer housing 1520.

FIG. 17 is a diagram illustrating experimental results obtained in a case in which the change portion is disposed at a position corresponding to one-third (⅓) of a length of the diffuser blade 1560 in a direction from the inner end toward the outer end thereof, and experimental results obtained in a case in which the change portion is disposed at a position corresponding to two-thirds (⅔) of the length of the diffuser blade 1560 in a direction from the inner end toward the outer end thereof.

Based on the results obtained in the case in which the change portion 1593 is disposed at the one-third position in an outer radial direction, it can be seen that when the blower fan 24 rotates at 1949 rpm, power consumption is 90.6 W and a noise level is 51.2 dB. Based on the results obtained in the case in which the change portion 1593 is disposed at the two-thirds position in an outer radial direction, it can be seen that when the blower fan 24 rotates at 1953 rpm, power consumption is 91.1 W and a noise level is 51.4 dB.

Based on the results of FIG. 17, it can be concluded that it is desirable to provide the change portion 1593 at a position adjacent to the inner housing 1540 in terms of power consumption and noise. Accordingly, in this embodiment, the change portion 1593 is disposed at the one-third position in an outer radial direction.

FIG. 18 illustrates a graph of air volume versus noise in a comparison of the embodiment and a general technique. While the general technique provides only one sweep angle, the embodiment disclosed herein provides the first sweep angle 1591 and the second sweep angle 1592. In this embodiment, the discharged air is separated from the rear end (upper end in this embodiment) of the diffuser blades 1560 with a phase difference, such that noise may be reduced.

Based on the result of FIG. 18, it can be seen that compared to the general technique, the diffuser blades 1560 according to embodiment disclosed herein may reduce noise by 0.4 dB, and power consumption of the blower motor 22 may be reduced by 1.2 W.

FIG. 19 illustrates a graph of frequency versus noise in a comparison of an embodiment and a general technique. The frequency is a Blade Passing Frequency (BPF), and a frequency of a noise component passing through the diffuser blades 1560.

Referring to FIG. 19, it can be seen that while two noise peaks occur at frequencies lower than or equal to 500 Hz, the embodiment shows a reduction in noise peak in the same interval.

A humidification and air cleaning apparatus according to embodiments disclosed herein disclosure have at least one or more of the following advantages.

Firstly, embodiments disclosed herein provide the first sweep angle and the second sweep angle for the diffuser blades, and an included angle is formed between the first sweep angle and the second sweep angle, such that a phase difference may be formed in the air passing through the diffuser blades, and thus, air flow noise may be reduced. Secondly, in embodiments disclosed herein, air is separated upward from the diffuser blades with a phase difference by the first sweep angle and the second sweep angle, such that peak noise occurring due to collision with the discharged air may be reduced. Thirdly, in embodiments disclosed herein, the diffuser blades have the first sweep angle and the second sweep angle, such that even when an air volume of the blower fan increases, the increase in noise may be minimized.

Fourthly, in embodiments disclosed herein, the change portion is provided at an optimal position for forming the first sweep angle and the second sweep angle. Fifthly, the first sweep angle and the second sweep angle are formed at the front end of the diffuser blades, such that a phase difference may be formed effectively in air discharged from the blower fan. Sixthly, in embodiments disclosed herein, the change portion is disposed on the inside at a position corresponding to one-third of the length of the diffuser blades, such that collision with the second blade may be reduced on the outside where the air flows at a high speed, and thus, noise may be reduced. Seventhly, collision of the discharged air may be reduced with the first sweep angle and the second sweep angle, such that even when the blower motor rotates with the same number of rotations, a greater air volume may be generated.

Embodiments disclosed herein provide a humidification and air cleaning apparatus having diffuser blades capable of minimizing operating noise caused by a flow of discharged air of an air blower unit. Embodiments disclosed herein further provide a humidification and air cleaning apparatus capable of reducing air flow noise by forming a phase difference in air passing through the diffuser blades. Embodiments disclosed herein furthermore provide a humidification and air cleaning apparatus, in which air is separated upward from the diffuser blades with a phase difference, such that air flow noise may be reduced.

Embodiments are not limited to the aforementioned objects and other objects not described herein will be clearly understood by those skilled in the art from the following description.

In embodiments disclosed herein, a first sweep angle and a second sweep angle are formed at the diffuser blades, and an included angle is formed between the first sweep angle and the second sweep angle, such that a phase difference may be formed in air passing through the diffuser blades, and thus air flow noise may be reduced. Air is separated upward from the diffuser blades with a phase difference by the first sweep angle and the second sweep angle, thereby reducing peak noise caused by collision with the discharged air.

Embodiments disclosed herein provide a humidification and air cleaning apparatus that may include an outer housing forming an exterior and having a cylindrical shape; an inner housing disposed inside of the outer housing, and spaced apart from the outer housing; an air flow passage formed between the outer housing and the inner housing; a blower motor disposed inside of the inner housing; a blower fan disposed at a lower part or portion of the inner housing, and coupled to a rotational shaft of the blower motor; and a plurality of diffuser blades disposed at the air flow passage, connecting the outer housing and the inner housing, and guiding upward air blown by the blower fan. The plurality of diffuser blades may include a first blade having an inner end coupled to the inner housing, and a second blade having an outer end coupled to the outer housing and an inner end coupled to the first blade. The first blade and the second blade may form an included angle. Accordingly, a phase difference may be formed in air discharged at the included angle, thereby reducing noise and power consumption.

When viewed from a top, the first blade and the second blade may form the included angle. The diffuser blade may have a front end first coming into contact with the air blown by the blower fan, and a rear end, from which the air is separated. The front end of the first blade and the front end of the second blade may form the included angle. As the included angle is formed between the front end of the first blade and the front end of the second blade, the phase difference may be formed effectively in the air discharged and separated.

When viewed from a top, a virtual normal line, formed in the inner housing with respect to the rotational shaft, and the first blade may form a first sweep angle. The first sweep angle may rotate about the normal line in a same direction as a rotational direction of the blower fan.

When viewed from a top, a virtual normal line, formed in the inner housing with respect to the rotational shaft, and the second blade may form a second sweep angle. The second sweep angle may rotate further than the first sweep angle in the rotational direction of the blower fan.

A change portion for forming the included angle may be formed between the first blade and the second blade, The change portion may be disposed closer to the inner end coupled to the inner housing based on a length of the diffuser blade. The change portion may be formed at a position corresponding to one-third of the length of the diffuser blade.

The inner housing may include a side cover disposed to face the outer housing, and having an upper side and a lower side which are open; a bottom cover connected to a lower end of the side cover and having a bowl shape with an open upper side; and a shaft hole through which the rotational shaft of the blower motor vertically passes. The diffuser blades may connect the side cover and the outer housing. A height of the diffuser blades may be located within a height of the side cover.

The humidification and air cleaning apparatus may further include holes vertically passing through the bottom cover.

When viewed from a top, the plurality of diffuser blades may rotate about the rotational shaft further beyond the virtual normal line, formed in the inner housing, in the rotational direction of the blower fan. A constant-pressure surface of the diffuser blades may be disposed to face upward, and a suction surface of the diffuser blades may be disposed to face downward, and a plurality of ribs may be formed on the suction surface.

While embodiments have been particularly shown and described with reference to exemplary embodiments thereof, it will be understood by those skilled in the art that embodiments are not limited to those exemplary embodiments and various changes in form and details may be made therein without departing from the scope and spirit as defined by the appended claims and should not be individually understood from the technical spirit or prospect.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidification and air cleaning apparatus, comprising:
an outer housing forming an exterior and having a cylindrical shape;
an inner housing disposed inside of the outer housing, and spaced apart from the outer housing;
an air flow passage formed between the outer housing and the inner housing;
a blower motor disposed inside of the inner housing;
a blower fan disposed at a lower portion of the inner housing, and coupled to a rotational shaft of the blower motor; and
a plurality of diffuser blades disposed in the air flow passage, connecting the outer housing and the inner housing, and guiding upward air blown by the blower fan, wherein the plurality of diffuser blades comprises a first blade having an inner end coupled to the inner housing, and a second blade having an outer end coupled to the outer housing and an inner end coupled to the first blade, wherein a bent portion is formed at a connection portion between the first blade and the second blade that forms a phase difference in air passing through the plurality of diffuser blades, wherein the connection portion is disposed closer to the inner end of the first blade coupled to the inner housing based on a length of the plurality of diffuser blades, wherein when viewed from a top, a virtual normal line, formed in the inner housing with respect to the rotational shaft, and the first blade form a first sweep angle, wherein when viewed from the top, a virtual normal line, formed in the inner housing with respect to the rotational shaft, and the second blade form a second sweep angle, and wherein the second sweep angle is greater than the first sweep angle in the rotational direction of the blower fan.

2. The apparatus of claim 1, wherein when viewed from a top, the first blade and the second blade form an included angle.

3. The apparatus of claim 1, wherein each diffuser blade has a front end first coming into contact with the air blown by the blower fan, and a rear end, from which the air is separated, wherein the front end of the first blade and the front end of the second blade form an included angle.

4. The apparatus of claim 1, wherein the first sweep angle is disposed in the same direction as the rotational direction of the blower fan with respect to the normal line.

5. The apparatus of claim 1, wherein the inner housing comprises:
a side cover disposed to face the outer housing, and having an upper side and a lower side which are open;
a bottom cover connected to a lower end of the side cover and having a bowl shape with an open upper side; and
a shaft hole through which the rotational shaft of the blower motor vertically passes.

6. The apparatus of claim 5, wherein the plurality of diffuser blades connects the side cover and the outer housing.

7. The apparatus of claim 5, wherein a height of the plurality of diffuser blades is located within a height of the side cover.

8. The apparatus of claim 5, further comprising holes that vertically pass through the bottom cover.

9. The apparatus of claim 1, wherein when viewed from a top, the plurality of diffuser blades is disposed in the same direction as the rotational direction of the blower fan with respect to a virtual normal line, formed in the inner housing.

10. The apparatus of claim 1, wherein a constant-pressure surface of each diffuser blade is disposed to face upward and a suction surface of each diffuser blade is disposed to face downward, and wherein a plurality of ribs is formed on the suction surface.

11. A humidification and air cleaning apparatus, comprising:
an outer housing forming an exterior and having a cylindrical shape;
an inner housing disposed inside of the outer housing, and spaced apart from the outer housing;
an air flow passage formed between the outer housing and the inner housing;
a blower motor disposed inside of the inner housing;
a blower fan disposed at a lower portion of the inner housing, and coupled to a rotational shaft of the blower motor; and
a plurality of diffuser blades disposed in the air flow passage, connecting the outer housing and the inner housing, and guiding upward air blown by the blower fan, wherein the plurality of diffuser blades comprises a first blade having an inner end coupled to the inner housing, and a second blade having an outer end coupled to the outer housing and an inner end coupled to the first blade, wherein a bent portion is formed at a connection portion between the first blade and the second blade that forms a phase difference in air passing through the plurality of diffuser blades, wherein the connection portion is disposed closer to the inner end of the first blade coupled to the inner housing based on a length of the plurality of diffuser blades, and wherein the connection portion is formed at a position corresponding to one-third of the length of the plurality of diffuser blades.

12. A humidification and air cleaning apparatus, comprising:
an outer housing forming an exterior and having a cylindrical shape;
an inner housing disposed inside of the outer housing, and spaced apart from the outer housing;
an air flow passage formed between the outer housing and the inner housing;
a blower motor disposed inside of the inner housing;
a blower fan disposed at a lower portion of the inner housing, and coupled to a rotational shaft of the blower motor; and
a plurality of diffuser blades disposed in the air flow passage, connecting the outer housing and the inner housing, and guiding upward air blown by the blower fan, wherein the plurality of diffuser blades comprises a first blade having an inner end coupled to the inner housing, and a second blade having an outer end coupled to the outer housing and an inner end coupled to the first blade, wherein a change portion for forming an included angle is formed between the first blade and the second blade, wherein the change portion is disposed closer to the inner end coupled to the inner housing based on a length of the plurality of diffuser blades, wherein when viewed from a top, a virtual normal line, formed in the inner housing with respect to the rotational shaft, and the first blade form a first sweep angle, wherein when viewed from the top, a virtual normal line, formed in the inner housing with respect to the rotational shaft, and the second blade form a second sweep angle, and wherein the second sweep angle is greater than the first sweep angle in the rotational direction of the blower fan.

13. The apparatus of claim 12, wherein the change portion is formed at a position corresponding to one-third of the length of the plurality of diffuser blades.

14. A humidification and air cleaning apparatus, comprising:
an outer housing forming an exterior and having a cylindrical shape;
an inner housing disposed inside of the outer housing, and spaced apart from the outer housing;
an air flow passage formed between the outer housing and the inner housing;
a blower motor disposed inside of the inner housing;
a blower fan disposed at a lower portion of the inner housing, and coupled to a rotational shaft of the blower motor; and
a plurality of diffuser blades disposed in the air flow passage, connecting the outer housing and the inner housing, and guiding upward air blown by the blower fan, wherein the plurality of diffuser blades comprises a first blade having an inner end coupled to the inner housing, and a second blade having an outer end coupled to the outer housing and an inner end coupled to the first blade, and wherein a bent portion is formed at a connection portion between the first blade and the second blade that forms a phase difference in air passing through the plurality of diffuser blades, wherein the connection portion is disposed closer to the inner end of the first blade coupled to the inner housing based on a length of the plurality of diffuser blades, and wherein the connection portion is formed at a position corresponding to one-third of the length of the plurality of diffuser blades.

* * * * *